US010053374B2

(12) United States Patent
Li et al.

(10) Patent No.: US 10,053,374 B2
(45) Date of Patent: Aug. 21, 2018

(54) SYSTEMS AND METHODS FOR WATER DESALINATION AND POWER GENERATION

(71) Applicant: UNIVERSITY OF SOUTH FLORIDA, Tampa, FL (US)

(72) Inventors: Chennan Li, Tampa, FL (US); D. Yogi Goswami, Tampa, FL (US); Elias K. Stefanakos, Tampa, FL (US)

(73) Assignee: University of South Florida, Tampa, FL (US)

( * ) Notice: Subject to any disclaimer, the term of this patent is extended or adjusted under 35 U.S.C. 154(b) by 420 days.

(21) Appl. No.: 14/417,573

(22) PCT Filed: Aug. 16, 2013

(86) PCT No.: PCT/US2013/055325
§ 371 (c)(1),
(2) Date: Jan. 27, 2015

(87) PCT Pub. No.: WO2014/028832
PCT Pub. Date: Feb. 20, 2014

(65) Prior Publication Data
US 2015/0251924 A1    Sep. 10, 2015

Related U.S. Application Data

(60) Provisional application No. 61/683,966, filed on Aug. 16, 2012.

(51) Int. Cl.
*C02F 1/16* (2006.01)
*B01D 3/14* (2006.01)
(Continued)

(52) U.S. Cl.
CPC ............... *C02F 1/16* (2013.01); *B01D 3/145* (2013.01); *B01D 3/146* (2013.01); *F01K 23/064* (2013.01); *C02F 2103/08* (2013.01); *Y02W 10/37* (2015.05)

(58) Field of Classification Search
CPC combination set(s) only.
See application file for complete search history.

(56) References Cited

U.S. PATENT DOCUMENTS 3,352,107 A  * 11/1967 Blaskowski ............. C02F 1/04
                                                    60/648
4,094,747 A  *  6/1978 Pfenninger ............ C02F 1/16
                                                    202/173
(Continued)

OTHER PUBLICATIONS

Zimmerman, Z., "Development of Large Capacity High Efficiency Mechanical Vapor Compression (MVC) Units", Desalination, 96, 1994.

(Continued)

*Primary Examiner* — Brian R Gordon
(74) *Attorney, Agent, or Firm* — Thomas | Horstemeyer, LLP (57) ABSTRACT

In one embodiment, a water desalination and power generation system includes a power generation subsystem, a water desalination subsystem, and an ejector that links the power generation subsystem and the water desalination subsystem, the ejector being adapted to entrain working fluid steam that has exited the water desalination subsystem into working fluid steam that has exited the power generation subsystem to generate mixed steam that drives the water desalination subsystem.

23 Claims, 8 Drawing Sheets

(51) Int. Cl.
   F01K 23/06       (2006.01)
   C02F 103/08      (2006.01)

(56)                  References Cited

U.S. PATENT DOCUMENTS

| | | | | |
|---|---|---|---|---|
| 4,121,977 | A * | 10/1978 | Carson | C02F 1/14 |
| | | | | 203/11 |
| 4,407,131 | A | 10/1983 | Wilkinson | |
| 4,594,850 | A | 6/1986 | Joy | |
| 4,873,840 | A | 10/1989 | Gilliusson | |
| 5,096,543 | A * | 3/1992 | Elmore | B01D 1/16 |
| | | | | 202/172 |
| 6,651,443 | B1 | 11/2003 | Meckler | |
| 6,833,056 | B1 * | 12/2004 | Kamiya | B01D 1/0047 |
| | | | | 202/155 |
| 7,497,666 | B2 | 3/2009 | Garris, Jr. | |
| 9,540,250 | B2 * | 1/2017 | Schubert | C02F 1/048 |
| 2002/0119051 | A1 * | 8/2002 | Campbell | F04F 5/463 |
| | | | | 417/198 |
| 2002/0178723 | A1 * | 12/2002 | Bronicki | F01K 17/04 |
| | | | | 60/641.2 |
| 2003/0230534 | A1 * | 12/2003 | Donaldson | B01D 61/022 |
| | | | | 210/652 |
| 2004/0128976 | A1 * | 7/2004 | Gralla | C02F 1/16 |
| | | | | 60/39.182 |
| 2005/0072662 | A1 * | 4/2005 | Holtzapple | F04F 5/466 |
| | | | | 202/155 |
| 2008/0083605 | A1 * | 4/2008 | Holtzapple | C02F 1/041 |
| | | | | 203/11 |
| 2010/0154419 | A1 | 6/2010 | Kontomaris | |
| 2010/0275599 | A1 * | 11/2010 | Glynn | B01D 1/0035 |
| | | | | 60/641.9 |
| 2011/0147195 | A1 * | 6/2011 | Shapiro | C02F 1/16 |
| | | | | 203/10 |
| 2012/0167873 | A1 * | 7/2012 | Venetos | F01K 13/00 |
| | | | | 126/609 |
| 2013/0269347 | A1 * | 10/2013 | Muthuramalingam | |
| | | | | F01K 17/025 |
| | | | | 60/648 |
| 2014/0034479 | A1 * | 2/2014 | Peng | C01B 3/384 |
| | | | | 203/22 |
| 2014/0060519 | A1 * | 3/2014 | Bent | F01K 7/22 |
| | | | | 126/714 |
| 2016/0194217 | A1 * | 7/2016 | Al-Ghizzy | C02F 1/16 |
| | | | | 203/10 |

OTHER PUBLICATIONS

Addelrassoul, RA, "Potential for economic solar desalination in the Middle East", Renewable Energy, 1998.
Abuyayeh, et al., "Solar Flash Desalination Under Hydrostatically Sustained Vacuum", Journal of Energy Engineering, vol. 131, No. 3, 2009.
Al-Ansari, et al., "Water-zeolite adsorption heat pump combined with single effect evaporation desalination process", Renewable Energy, 2009.
Al-Kharabsheh, et al., "Analysis of an innovative water desalination system using low-grade solar heat", Desalination, vol. 156, No. 1-3, 2003.
Abutayeh, et al., "Passive vacuum solar flash desalination", AIChE Journal, 2009.
Abutayeh, et al., "Experimental Simulation of Solar Flash Desalination", Journal of Solar Energy Engineering, vol. 132, No. 4, Nov. 2010.
Alarcon-Padilla, et al., "Application of absorption heat pumps to multi-effect distillation: a case study of solar desalination", Science Direct, 2007.
Al-Qahtani, H., "Feasibility of Utilizing solar energy to power reverse osmosis domestic unit to desalinate water in the state of bahrain", Renewable energy, 1996.
Ayhan, et al., "Feasibilty study of renewable energy powered seawater desalination technology using nature vacuum technique", Renewable Energy, Science Direct, 2010.
Bahar, et al., "Performance analysis of combined humidified gas turbine power generation and multi-effect thermal vapor compression desalination systems" Desalination, 2006.
Bulusu, et al., "The influence of shear layer turbulence on stationary pseudoblades in supersonic pressure exchange inducing flow fields", J. Fluids Eng. 2011.
Dai, et al., "Exergy analysis, parametric analysis and optimization for a novel combined power ejector refrigeration cycle", Applied Thermal Engineering, 2009.
Chang, et al., "Modeling and optimization of solar driven membrane distillation desalination system", Renewable Energy, 2010.
Bajpayee, et al., "Very low temperature membrane-free desalination by directional solvent extraction", Energy & Environmental Science, 2011.
El-Dessouky, et al., "Steady-state analysis of the multiple effect evaporation desalination process", Desalination procesd, Chemical Engineering & Technology, 1998.
Bouguecha, et al., "Small scale deslination pilots powered by renewable energy sources: case studies", ResearchGate, 2005.
Chunnanond, et al., "Ejectors: application sin refrigeration technology", ScienceDirect, Renewable and Sustainable Energy Reviews, 2004.
Ettouney, Hisham, "Design of single-effect mechanical vapor compression", Desalination, 2006.
Bulusu, et al., "Evaluation of efficiency in compressible flow ejectors", ASME Conver. Proc., 2008.
Cizungu, et al., "Performance comparison of vapor jet refrigeration system with environment friendly working fluids", Applied Thermal Engineering, 2001.
Ferandez-Izquerdo, et al., "Experimental analysis of multi-effect distillation unit operated out of nominal conditions", Desalination, 2012.
Garcia-Rodriguez, L. "Seawater Desalination Driven by Renewable Energies: A Review", Elsevier, Desalination, 2002.
Gould, David, "Theoretical Analysis of the Steam Pressure Exchange Ejector for an Automotive Air Conditioning Application", Master of Science Thesis: George Washington University, 2009.
Huang, et al., "A 1-D Analysis of Ejector Performance", Elsevier, International Journal of Refrigeration, 2005.
Gude, et al., "Renewable and Sustainable Approaches for Desalination", ScienceDirect, 2010.
Garris, et al., "A New Thermally Driven Refrigeration System with Environmental Benefits", 33rd Intersociety Engineering Conference on Energy Conversion, 1998.
Hoffman, Allan, "Water Security: A Growing Crisis and the Link to Energy", AIP Conf. Proc., 2008.
Gomri, R., "Thermal Seawater Desalination: Possibilities of Using Single Effect and Double Effect Absorption Heat Transformer Systems", Desalination, 2010.
Hong, et al., "A Novel Thermally Driven Rotor-Vane/Pressure-Exchange Ejector Refrigeration System with Environmental Benefits and Energy Efficiency", Energy, 2004.
Rafet Y., "Experimental Investigation of Performance of Vapor Ejector Refrigeration System Using Refrigerant R123", Energy Conversion and Management, 2008.
Wang, et al., "Proposal and analysis of a high-efficiency combined desalination and refrigeration system based on the LiBr—H2O absorption cycle—Part 1: System configuration and mathematical model", Energy Conversion and Management 52, 2011.
Wang, et al., Proposal and analysis of a high-efficiency combined desalination and refrigeration system based on the LiBr—H2O absorption cycle—Part 2: Thermal performance analysis and discussions. Energy Conversion and Management 52, 2011.
Wang, et al., "A new combined cooling, heating and power system driven by solar energy", Renewable Energy, 2009.
Wang, et al., "Experimental investigation of an adsorption desalination plant using low-temperature waste heat", Science Direct, 2005.

(56) References Cited

OTHER PUBLICATIONS

Somak, W. "CFD Optimization Study of High-Efficiency Jet Ejectors", Dissertation of doctor of philosophy, Texas A&M University, 2010.

Veil, John, "Thermal Distillation Techonology for Management of Produced Water and Frac Flowback Water", Argonne National Laboratory, 2010.

Wang, et al., "Peformance analysis of combined humidified gas turbine power generation and multi-effect thermal vapor compression desalination systems—Part 1: The desalination unit and its combination with a steam-injected gas turbine power system", Desalination, 2006.

Wang, et al., "Performance analysis of combined humidified gas turbine power generation and multi-effect thermal vapor compression deslatination systems", Desalination, 2007.

Kouhikamali, R., "Process investigation of different locations of thermocompression suction in MED-TVC plants", Desalination Press. 2011.

Pianthong, et al., "Investigation and Improvement of Ejector Refrigeration System using Computational Fluid Dynamics Technique", Energy Conversion and Management, 2007.

Sharqawy, et al., "On exergy calculations of seawater with applications in desalination systems", International Journal of Thermal Sciences, 2011.

Li, et al., "Transcritical CO2 refrigeration cycle with ejector-expansion device", Elseivier, International Journal of Regrigeration, 2005.

Schiermeier, Q., "Purification with a pinch of salt", Nature, 2008.

Sharqawy, et al., "Thermophyscial properties of seawater: A review of existing correlations and Data", Deslination and Water Treatment, 2010.

Mandani, et al., "LiBr—H2O absorption heat pump for single-effect evaporation desalination process", Desalination, 2000.

Mehanna, et al., "Using microbial desalination cells to reduce water salinity prior to reverse osmosis", Energy and Environmental Science, 2010.

Shannon, et al., "Science and Technology for water purification in the coming decades", Nature, 2008.

Service RF. Desalination Freshens Up. Science 2006.

Slesarenko, V., "Heat pumps as a source of heat energy for desalination of seawater", Desalination, 139, 2001.

Marcovecchio, et al., "Global Optimal Design of Mechanical Vapor Compression (MVC) Desalination Process", 20th EP Symposium on Computer Aided Process Engineering, vol. 28, Elsevier, 2010.

\* cited by examiner

SYSTEMS AND METHODS FOR WATER DESALINATION AND POWER GENERATION

CROSS-REFERENCE TO RELATED APPLICATION

This application is the 35 U.S.C. § 371 national stage of, and claims priority to and the benefit of, PCT application PCT/US2013/055325, filed Aug. 16, 2013, which claims priority to and the benefit of U.S. Provisional Application No. 61/683,966, filed on Aug. 16, 2012, herein incorporated by reference in their entirety.

BACKGROUND

Desalination is not only necessary to overcome fresh water shortage issues of the future but is also important for the oil-gas-coal industry, which generates substantial amounts of waste water during the production of oil, natural gas, and coal. Multi-effect distillation (MED), multi-stage flash (MSF), and reverse osmosis (RO) are the dominant desalination processes with RO having the largest installed capacity. When handling brackish water or even seawater, the RO process is energy efficient. However, it requires stringent pretreatment and a dramatic osmotic pressure increase with increased salt concentration. This limits the RO process to low concentration feed water desalination applications.

On the other hand, a thermal process, such as MED, is robust, requires less pretreatment, and could handle high concentration water sources. Because thermal desalination is regarded as energy intensive, seawater desalination and hydraulic fracturing flowback water desalination require more energy than conventional water treatment due to the higher salt concentration. It would be desirable to have a thermal desalination system that could use alternative energy sources and technologies to reduce environmental concerns. Furthermore, it would be desirable to improve the energy efficiency of thermal desalination.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As identified above, it would be desirable to have a thermal water desalination system that could use alternative energy resources and that is more energy efficient. Disclosed herein are examples of such systems. In one embodiment, the system takes the form of a water desalination and power generation system that can be used to both desalinize water and generate mechanical or electrical power. In some embodiments, the system is driven by low-grade heat sources, such as solar energy, geothermal heat, or waste heat from an industrial process. Instead of wasting the latent heat of steam that remains after the desalination process, the latent heat is continuously recovered by the system and reused in the desalination process. In some embodiments, the system combines an organic Rankine cycle (ORC) or a supercritical organic Rankine cycle (SORC) subsystem, an ejector, and a multi-effect distillation (MED) desalination subsystem, and can be used for seawater or concentrated brine, such as hydraulic fracturing flowback water produced during natural gas mining.

In the following disclosure, various specific embodiments are described. It is to be understood that those embodiments are example implementations of the disclosed inventions and that alternative embodiments are possible. All such embodiments are intended to fall within the scope of this disclosure.

Figure 1:
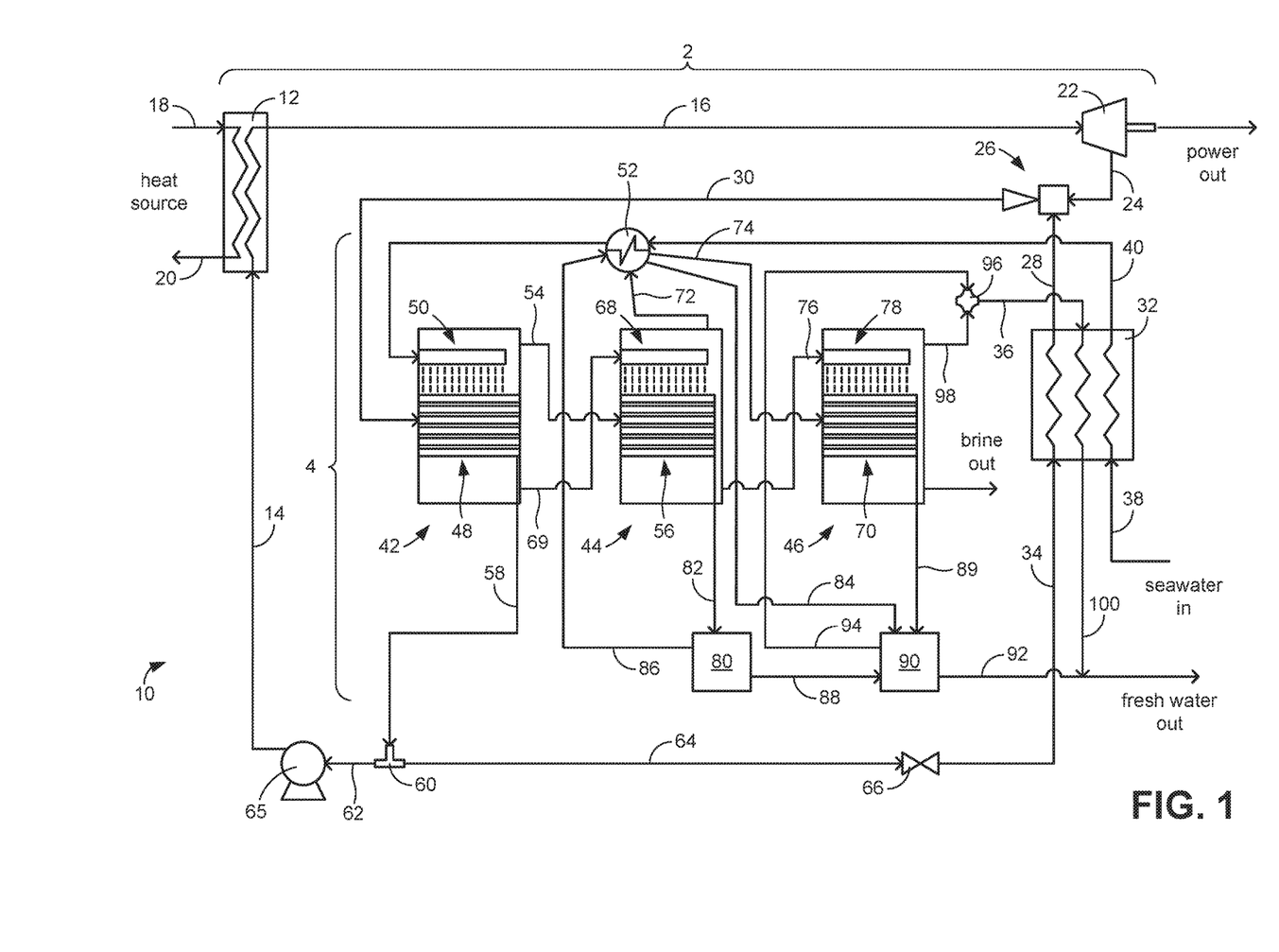
FIG. 1 is a block diagram of an embodiment of a water desalination and power generation system.

FIG. 1 illustrates an embodiment of water desalination and power generation system 10. Generally speaking, this example system 10 comprises three subsystems: a power generation subsystem 2, a water desalination subsystem 4, and an ejector that links the two subsystems.

With reference to the upper left corner of FIG. 1, the system 10 includes a boiler 12 that boils a working fluid supplied by line 14 to produce steam that flows through line 16. In some embodiments, the working fluid is an organic fluid. By way of example, the working fluid can comprise a refrigerant, such as R152a or R32. The heat used to drive the boiler 12 is supplied by a heat source via supply line 18. The fluid then returns to the heat source via line 20. As described above, the heat source can be a low-grade heat source, such as a solar energy source, a geothermal source, or an industrial process source (i.e., waste heat from the process). By way of example, the fluid supplied by the heat source is at a temperature of approximately 50 to 300° C. (e.g., 150° C.).

The steam in the line 16 has an elevated temperature and pressure. By way of example, the steam can have a temperature of approximately 50 to 300° C. (e.g., 140° C.) and a pressure of approximately 0.01 to 12 MPa (e.g., 5 MPa). The elevated temperature and pressure of the steam can be utilized to perform mechanical and/or electrical work. Accordingly, the steam can be delivered to an expander 22 that converts the heat energy in the steam into mechanical and/or electrical power. By way of example, the expander 22 can be a scroll expander that generates mechanical energy.

In conventional power systems, the steam that exits an expander such as that shown in FIG. 1 is typically delivered to a condenser to return the working fluid to liquid form. In the system 10, however, the steam that exits the expander 22 is delivered via line 24 to an ejector 26 so that it can be used as primary steam for the desalination process. Although this steam has a lower temperature and pressure than the steam within line 16, it is still has a relatively high temperature and pressure. By way of example, the steam in line 24 has a temperature of approximately 50 to 135° C. (e.g., 127° C.) and a pressure of approximately 5 to 4500 kPa (e.g., 4006 kPa). In some embodiments, the ejector 26 comprises a converging-diverging nozzle that is simple in design and therefore inexpensive to construct and purchase. Although conventional ejectors can suffer from low efficiencies, high-efficiency ejectors have been both theoretically and experimentally evaluated that have efficiencies as high as 90% under specific conditions. The diverging portion of the nozzle accelerates the steam from line 24 to create a strong vacuum that entrains secondary steam having relatively low temperature and pressure from line 28 to form a mixed steam that flows through line 30.

Figure 2:
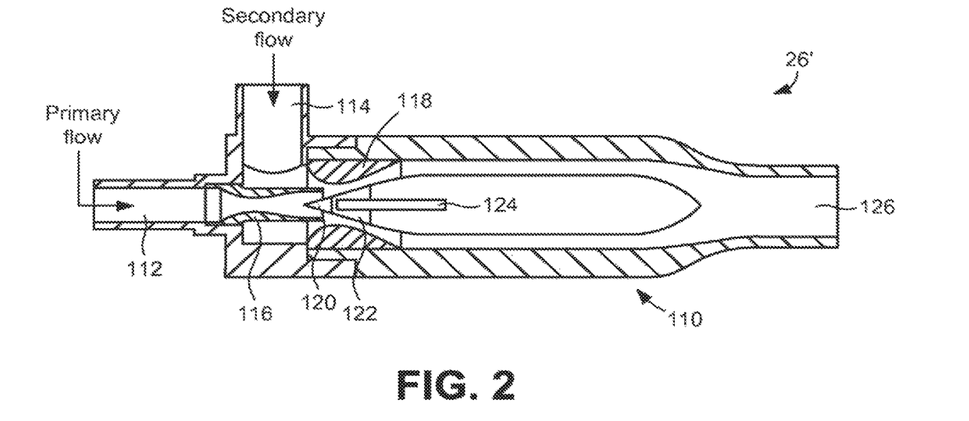
FIG. 2 is a cross-sectional view of an embodiment of an ejector that can be used in the system of FIG. 1.

FIG. 2 illustrates an example ejector in the form of a pressure exchange ejector 26' that could be used in the system 10. As shown in FIG. 2, the ejector 26' generally comprises a housing 110 that includes a first inlet 112 for a primary flow and a second inlet 114 for a secondary flow. Provided within the housing 110 is a nozzle 116, such as a supersonic converging-diverging nozzle, through which the primary flow passes and a shroud 118 in which a portion of the nozzle is positioned and through which both the primary flow and the secondary flow pass. Also positioned within the shroud 118 is a cone 120 and a rotor 122 from which a shaft 124 extends. The mixed primary flow and secondary flow then exits the housing through an outlet 126.

Returning to FIG. 1, the steam within line 28 that is entrained into the steam from line 24 is the working fluid that has already passed through the desalination subsystem (described below) and that has been boiled using a condenser 32. More particularly, the working fluid is delivered in liquid form at a temperature of approximately 0 to 40° C. (e.g., 33° C.) and a pressure of approximately 1 to 2500 kPa (e.g., 752 kPa) to the condenser 32 via line 34 and is boiled by heat provided by freshwater steam that exits the desalination subsystem via line 36. By way of example, the freshwater steam within line 36 is at a temperature of approximately 10 to 50° C. (e.g., 35° C.) and a pressure of approximately 1.23 to 12.33 kPa (e.g., 5.6 kPa). In conventional thermal desalination systems, the latent heat of condensation within that steam would normally be wasted and would generate thermal pollution that, for example, would be output into the ocean. In the system 10, however, the latent heat of the freshwater steam is continuously recovered and is reused in the desalination process by providing latent heat within the working fluid steam of line 28 that can be delivered to the desalination subsystem. The steam within line 28 that results from the heat transfer in the condenser 32 is at a relatively low temperature and pressure. By way of example, the steam within line 28 has a temperature of approximately 0 to 45° C. (e.g., 33° C.) and a pressure of approximately 5 to 2500 kPa (e.g., 752 kPa). Despite those relatively low values, the steam within line 28 has substantial latent heat that can be released when the steam condenses into a liquid.

The freshwater steam from line 36 is also used to heat the source water that is to be desalinized by the system 10. In this example, the source water is assumed to be seawater. By way of example, seawater is supplied to the condenser 32 via line 38 at a temperature of approximately 15 to 40° C. (e.g., 25° C.) and leaves the condenser via line 40 at a temperature of approximately 20 to 45° C. (e.g., 33° C.).

The mixed steam within the line 30 that results from entraining the steam from line 28 into the steam from line 24 has a temperature that is lower than that of the steam within line 24 but higher than that of the steam within line 28. By way of example, the mixed steam has a temperature of approximately 50 to 110° C. (e.g., 80° C.) and a pressure of approximately 5 to 2500 kPa (e.g., 1687 kPa). The mixed steam is delivered to the first evaporator 42 of the desalination subsystem. In the illustrated embodiment, the desalination subsystem comprises three evaporators, namely the first evaporator 42, a second evaporator 44, and a third evaporator 46. It is noted, however, that a greater or a fewer number of evaporators could be used. Irrespective of the number of evaporators that are used, their operating temperatures and pressures decrease from the beginning of the desalination subsystem toward the end. As is shown in FIG. 1, the mixed steam is delivered to heating elements 48 of the first evaporator 42. In some embodiments, the heating elements 48 comprise tubes that segregate the working fluid from the seawater.

The seawater within line 40 is also delivered to the first evaporator 42. In particular, the seawater is delivered to spray nozzles 50 of the evaporator 42 that spray the seawater onto the heating elements 48. Before reaching the nozzles 50, however, the seawater is preheated in a preheater 52 that, as described below, utilizes heat from freshwater steam generated by the desalination subsystem to raise the temperature of the seawater. By way of example, the preheater 52 raises the temperature of the seawater to approximately 45 to 65° C. (e.g., 55° C.).

Because of the relatively high temperature of the mixed steam flowing through the heating elements 48, some of the seawater sprayed onto the elements boils to generate freshwater steam. That steam can be delivered via line 54 to the heating elements 56 of the second evaporator 44.

After releasing its heat to the seawater in the first evaporator 42, the working fluid steam condenses and forms a liquid stream that flows through line 58 to a splitter 60 that separates the liquid flow into two parts: one part along line 62 and another part along line 64. During this process, the working fluid does not mix with the seawater or freshwater steam. The working fluid flowing through line 62 is delivered to a pump 65 that raises the pressure of the working fluid to 500 to 12000 kPa (e.g., 4900 kPa), and supplies the working fluid back to the boiler 12 via line 14 so that it can be vaporized. The working fluid flowing through line 64, however, is delivered to a throttle valve 66, which lowers the temperature and pressure of the fluid to approximately 0 to 50° C. (e.g., 33° C.) and 5 to 2500 kPa (e.g., 752 kPa). The lowered temperature and pressure working fluid then flows through line 34 to the condenser 32 for vaporization and absorption of the latent heat of the freshwater steam from line 36.

As mentioned above, part of the seawater sprayed into the first evaporator 42 boils to generate freshwater steam. Part of that seawater does not boil, however, and that remaining seawater is delivered to the nozzles 68 of the second evaporator 44 via line 69. That seawater is sprayed on the heating elements 56, which are heated by the freshwater steam from the first evaporator 42, to create further freshwater steam. Instead of being directly delivered to the heating elements 70 of the third evaporator 46, that steam is delivered to the preheater 52 via line 72. The steam from line 54 that is delivered to the heating elements 56 of the second evaporator releases its latent heat and condenses. The condensed liquid is delivered to a first flash box 80 via line 82 and is split into a steam stream that travels along line 86 and a liquid stream that travels along line 88.

The steam within line 86 is delivered to the preheater 52. Water that condenses in the preheater 52 is delivered to a second flash box 90 via line 84, while steam from the preheater is delivered to the heating elements 70 of the third evaporator 46 via line 74. After releasing the latent heat of vaporization, the steam from line 74 condenses to a liquid stream that flows along line 89 into the second flash box 90, in which it is mixed with the liquid from line 88. Because of the relatively low pressure in the second flash box 90, steam exits the flash box through line 94 while freshwater liquid exits the second flash box through line 92. This fresh water is the end product of the desalination process.

The steam that travels along line 94 is delivered to a coupler 96 that also receives freshwater steam from the third evaporator 46 via line 98. The combined freshwater steam then travels through line 36 to the condenser 32, in which it condenses and later joins line 92 via line 100.

In the above-described system 10, no reverse osmosis (RO) is used for desalination. It is noted, however, that RO could be used to replace the MED system into the system 10. For example, RO could be used with the power generated by the expander 22. RO source water could be preheated by the mixed steam within line 30, and the preheating process could reduce the RO desalination energy consumption.

A simulation was performed to test the above-described type of system. The simulation was carried out using the Engineering Equation Solver (EES) software. The computerized models were validated based on reported experimental data on forward-feed MED systems. The results in Table 1 indicate good agreement between the model predictions and the available experimental data. In the simulation, the power cycle working fluid is condensed at 65° C. and discharges heat to the desalination unit. This means that the stream that exits the first evaporator 42 is saturated liquid with a temperature of 65° C.

TABLE 1

Comparison of model predictions with data for MED unit *from reference [52]

| Thermal Input Temperature | Performance | Recovery rate | | Thermal power input (kW) | |
|---|---|---|---|---|---|
| (° C.) | Ratio | Reference | Model | Reference | Model |
| 57 | 8.9 | 0.2375 | 0.2375 | 137 | 135.6 |
| 60 | 9.1 | 0.275 | 0.275 | 153 | 153.5 |
| 63 | 9.3 | 0.3 | 0.3 | 166 | 163.9 |
| 65 | 9 | 0.3375 | 0.3375 | 191 | 190.5 |
| 68 | 10 | 0.3625 | 0.375 | 182 | 184.2 |
| 70 | 9.5 | 0.3625 | 0.3625 | 195 | 193.9 |
| 72 | 9.4 | 0.375 | 0.375 | 203 | 202.7 |
| 74 | 9.3 | 0.375 | 0.375 | 207 | 204.9 |

*MED final effect vapor temperature 35° C.

Figure 3A:
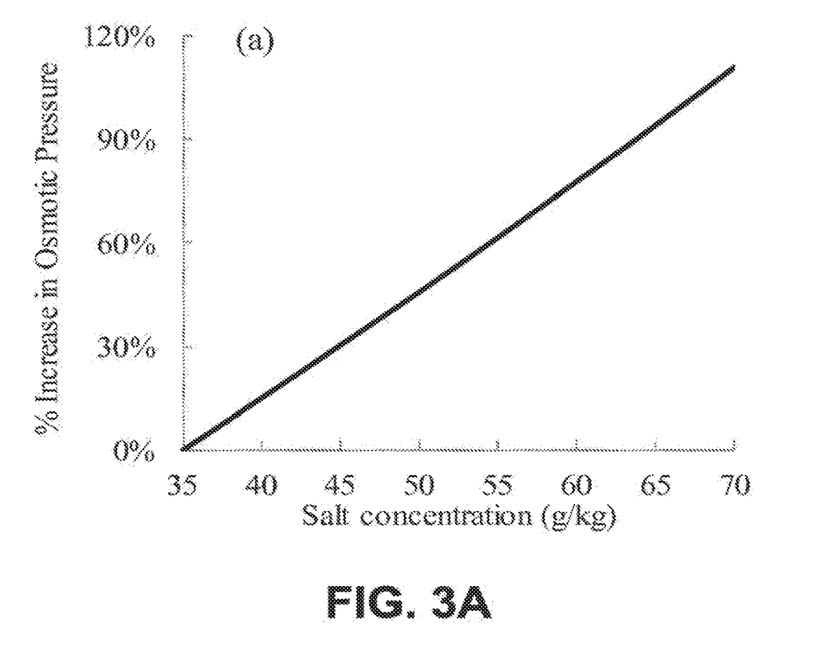
FIG. 3A is a graph that illustrates osmotic pressure change and specific area change compared to standard seawater 34 g/kg salt concentration osmotic pressure.

The RO process is energy efficient for brackish water treatment. However, as FIG. 3A shows, the osmotic pressure more than doubles when feed water concentration doubles (from 35 g/kg to 70 g/kg), which makes it difficult for the RO process to be used for highly-concentrated brine due to the physical strength limitations of RO polymer membranes.

Figure 3B:
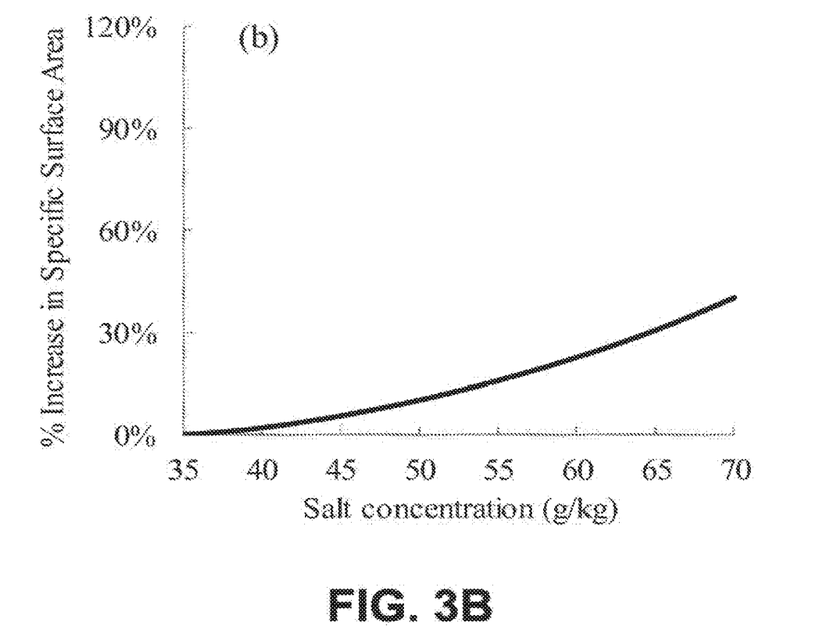
FIG. 3B is a graph that illustrates specific area increase percentage compared to seawater 35 g/kg when the MED has constant PR=9 and condenser approach ΔT=2° C.

On the other hand, thermal desalination systems are not significantly affected by the feed water salt concentration. Using an earlier validated system model, the proposed MED subsystem was analyzed for a thermal input temperature of 65° C. with a performance ratio (PR) of 9 as in Table 1, and the final condenser approach temperature $\Delta T$ was 2° C. FIG. 3B shows that, when the performance is fixed, the MED subsystem surface area increased a little more than 40% when feed water salt concentration doubled. Therefore, the proposed system is suitable for highly-concentrated brine treatment.

Figure 4A:
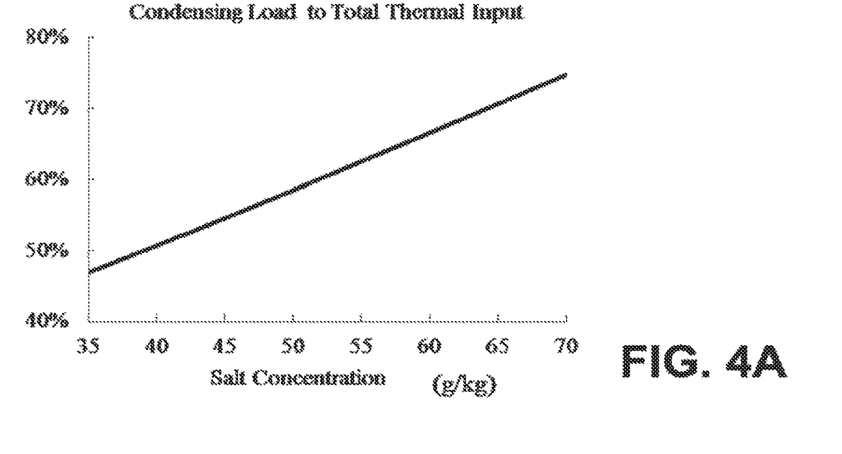
FIGS. 4A-4C are graphs that illustrate (A) percent ratio of condensing load to heat input, (b) specific heat exchange, and (C) percent of vapor condenses in preheater (for PR=9, condenser approach ΔT=2° C.).
Figure 4B:
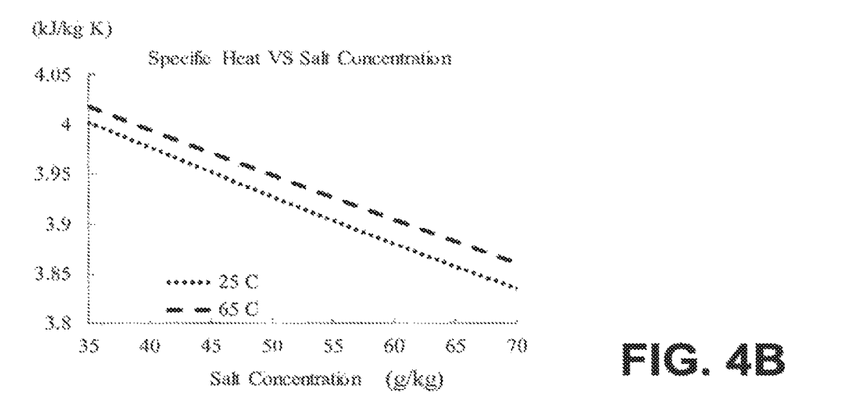
Figure 4C:
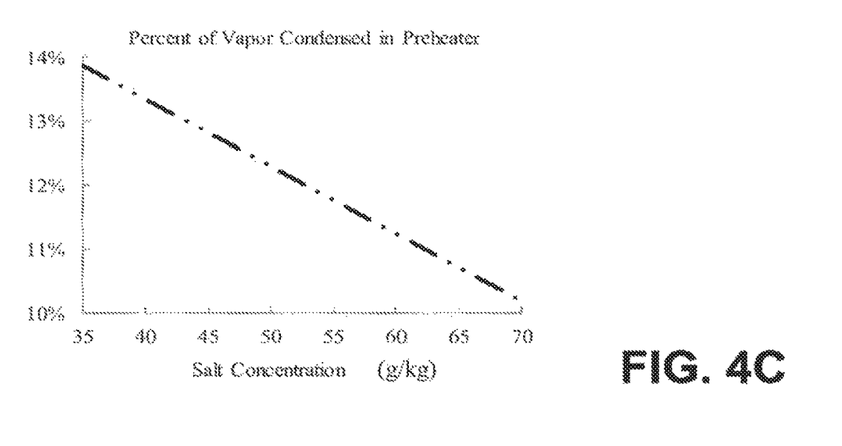

FIG. 4A shows the percentage of the final condenser cooling load divided by the MED first-effect heat input. The figure clearly indicates that, when the final condenser approach temperature and the MED PR are fixed, a higher salt concentration brine needs more cooling water. This is because higher salt concentrations have lower specific heat capacity, as shown in FIG. 4B. Less vapor is needed to preheat the higher salty brine, as illustrated in FIG. 4C. Therefore, more cooling water is needed to condense the final-effect vapor, which could cause environmental thermal pollution.

Figure 5:
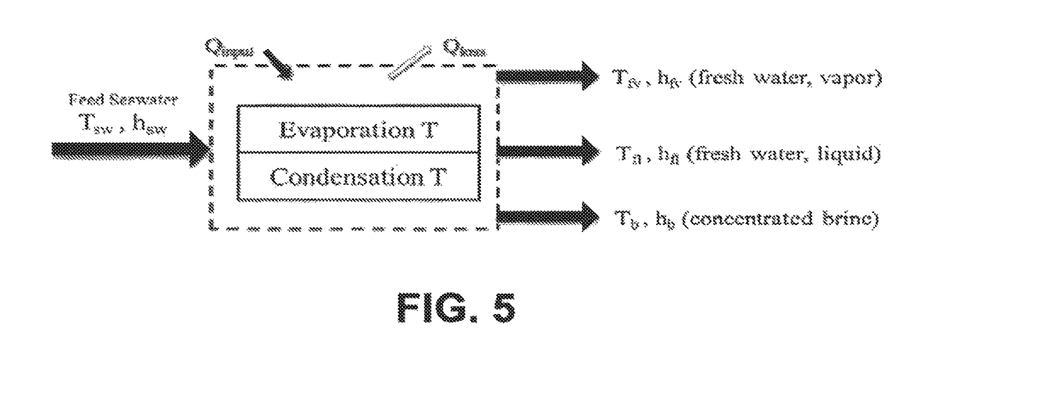
FIG. 5 is a block diagram that provides a general representation of a thermal desalination process.

The thermal desalination system energy consumption of the proposed system was estimated. As seen in FIG. 5, the thermal desalination process final products are brine, freshwater, and vapor. The mass and energy balances may be written as:

Energy Balance $Q_{input} - Q_{loss} + m_{sw}h_{sw} = m_b h_b + j_f h_{fl} +$
$$m_{fv} h_{fv} \tag{42}$$

$$h_{fv} + h_{fl} + \lambda \tag{43}$$

Mass Balance $m_{sw} = m_b + m_{fl} + m_{fv}$ \hspace{1em} (44)

$$m_f = m_{fl} + m_{fv} \tag{45}$$

Assuming that there is no heat loss, the recovery rate R may be written from equations (42)-(45) as $$R = \frac{m_f}{m_{sw}} = \frac{\dfrac{Q_{input}}{m_{sw}} + (h_{sw} - h_b)}{(h_{fl} - h_b) + \dfrac{m_{fv}}{m_f}\lambda}$$

where $h_{fl}$, $h_b$, $h_{sw}$ are the specific enthalpy of fresh water vapor, brine, and feed seawater, respectively, $\lambda$ is the latent heat at the final product temperature, and $m_f$ is the sum of the mass of the final vapor stream $m_{fv}$ and the final fresh water liquid stream $m_{fl}$.

Figure 6A:
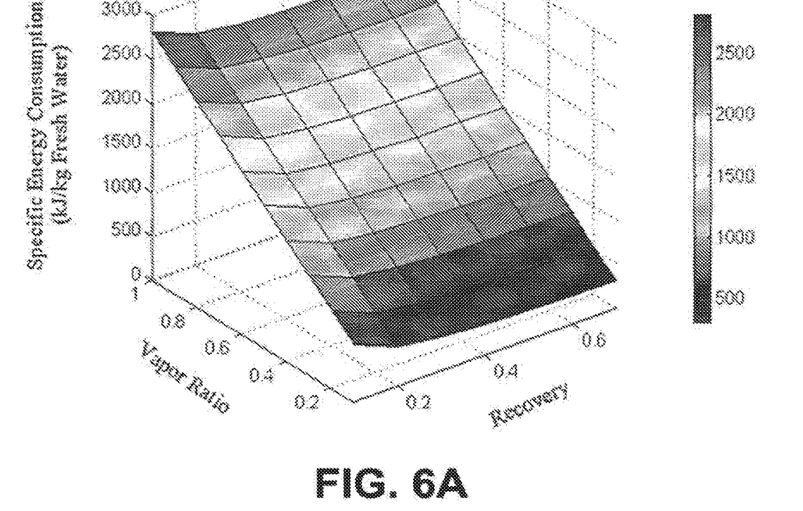
FIGS. 6A and 6B are graphs that illustrate the variation of specific energy consumption with vapor fraction (A) and recovery when final product is at 35° C. and (B) final product temperature when recovery is 50%.
Figure 6B:
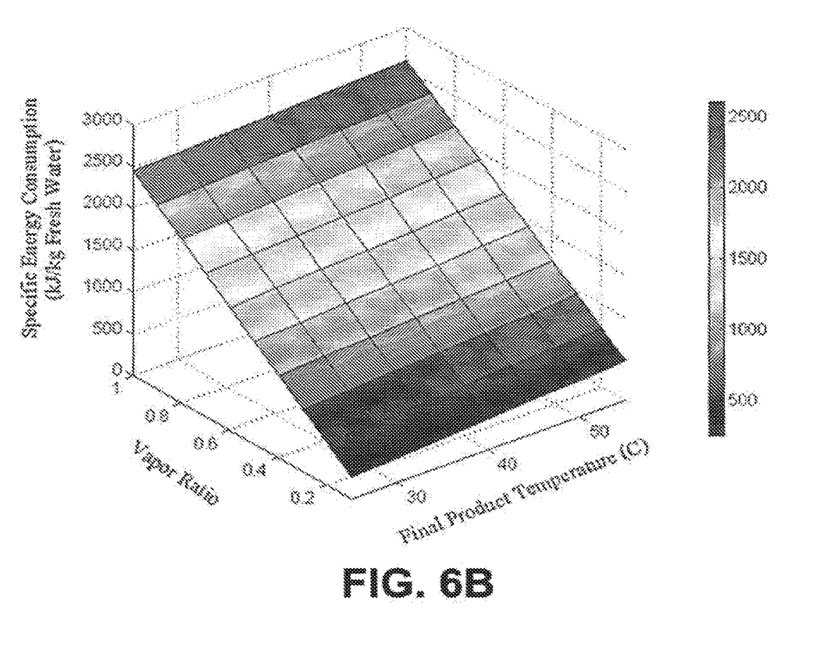

Assuming the feed seawater is at a temperature of 25° C. and the final products including vapor, liquid fresh water, and brine have the same temperature without considering the temperature elevation caused by salt, the specific energy consumption for a thermal desalination process, $q_s = Q_{input}/m_f$, may be written from Eq. (46) as:

$$q_s = \left[ (h_{fl} - h_b) - \frac{1}{2}(h_{sw} - h_b) \right] + \frac{m_{fv}}{m_f}\lambda \tag{47}$$

where R is the recovery of the desalination process. Once the recovery, R, is fixed, the specific energy is directly related to the amount of vapor condensed by the cooling water, which is discharged to the environment. FIGS. 6A and 6B show the estimated specific energy consumption with a vapor fraction of the total fresh water generated for a recovery of 50%. The vapor fraction is defined as $m_{fv}/m_f$. In a MED system, $m_{fv}/m_f$ is equal to the mass ratio of vapor condensed by the feed in seawater and the cooling water. Because this vapor fraction has a dominant effect on the specific energy consumption of a thermal desalination process, one could reduce the specific energy consumption by recovering the energy wasted in the cooling water in a traditional MED system. The lower the amount of vapor condensed by the discharged cooling water, the lower the energy required because less latent heat is wasted.

Based on the above analysis (FIGS. 4 and 6), increased salt concentration will cause more vapor production in the last effect, which means more cooling water is required. However, by recovering the latent energy in the last-effect vapor that is wasted in regular MED, the energy consumption could be reduced while also reducing the thermal pollution. Increased salt concentration will not cause too much specific area change compared with RO. Therefore, the proposed thermal MED system is potentially suitable for highly-concentrated brine treatment. By using an ejector to recover the latent heat of condensation from the last effect, cooling water is not needed, which will make the desalination system more energy efficient.

In the proposed system, the heat source is assumed to be 150° C. and, after transferring heat to the system, the heat transfer fluid returns at 100° C. The ejector efficiency and its entrainment ratio, the system high pressure, the cooling temperature (stream 14 temperature), the MED performance ratio, and the feed water salt concentration all affect each other. Therefore, sensitivity studies may be carried out in order to determine the key parameters for the system performance. In each case, the power cycle efficiency and system exergy efficiency changes can be studied first and the percentage of exergy destruction of each component will be shown last.

Power cycle pressure effects were also analyzed. For this analysis, the feed water salt concentration was fixed at 35 g/kg, which is the standard seawater salt concentration, the MED performance ratio was fixed at 9, which is the same as the reported experimental result using a 65° C. heating source, the final effect vapor was assumed to be 35° C., and the recovery was set to 0.3375 from the reported experimental conditions from Table 1. The power cycle working fluid was condensed at 65° C. to simulate the condition listed in Table 1 and the secondary flow of the ejector evaporated at 33° C., which means the approach $\Delta T_{MED\_c}$ was 2° C. The parameter conditions are listed in Table 2.

TABLE 2

Parameters for power cycle pressure effects sensitivity study

| Fixed Parameters | Independent Parameters | Dependent Parameters |
|---|---|---|
| (1) Brine Conc.: 35 g/kg | (1) System high pressure which is stream 8 pressure | (1) Entrainment ratio (Er) |
| (2) 14 effects MED PR. = 9 | | (2) System work output (thermal efficiency) |
| (3) Ejector eff. = 47.5% | | |
| (4) Cycle working fluid condensed at 65° C. | | (3) Components exergy destruction compare |
| (5) $\Delta T_{MED\_c}$ = 2° C. | | |
| (6) MED condensed at 35° C. | | |
| (7) MED recovery = 0.3375 | | (4) System exergy efficiency |
| (8) Pump Eff. = 80% | | |
| (9) Turbine Eff. = 85% | | |
| (10) Stream 1 temperature 140° C. | | |

Figure 7A:
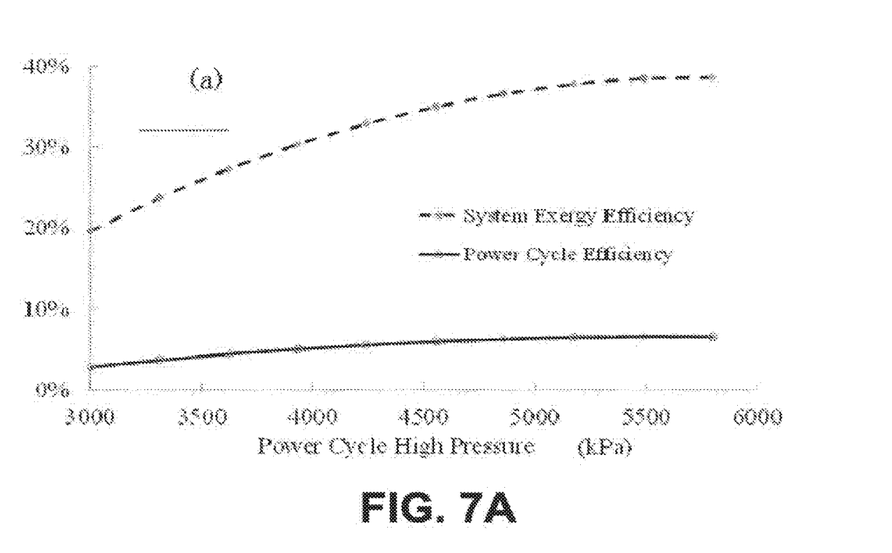
FIGS. 7A and 7B are graphs that illustrate the effect of power cycle high pressure on system parameters and show (A) system exergy efficiency and power cycle efficiency and (B) Entrainment ratio and mass ratio of primary flow to feed brine.
Figure 7B:
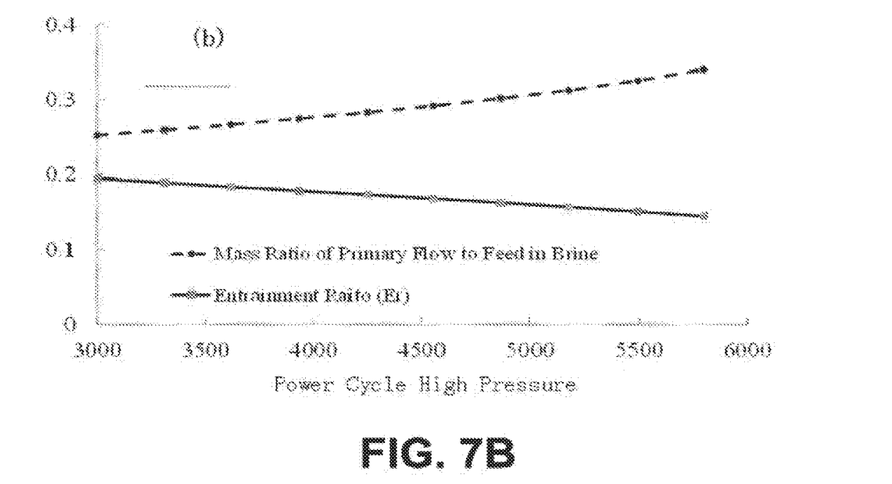

When the pressure changes, the turbine pressure ratio will vary and cause the pressure of the stream exiting the evaporator to change, which will cause the ejector entrainment ratio to change because of the fixed ejector efficiency. In such a case, the mixed stream exiting the ejector will also have a different temperature and mass flow rate. As a result, the mass flow rate of the power cycle will change and the net power output, the system exergy efficiency, and the entrainment ratio will also change accordingly. The results can be seen in FIG. 7. It can be appreciated from that figure that the system exergy efficiency increases rapidly with pressure until the pressure is near 5000 kPa, after which both the power cycle efficiency and system energy efficiency begin to stabilize. As the cycle-high pressure increases, the turbine pressure ratio also increases, which causes the turbine exit temperature to drop. In order to maintain the heat input to the MED system, the primary flow rate, which is the power cycle flow rate, needs to be increased, which causes the entrainment ratio to drop because the secondary flow rate in the ejector cycle is constant.

Figure 8A:
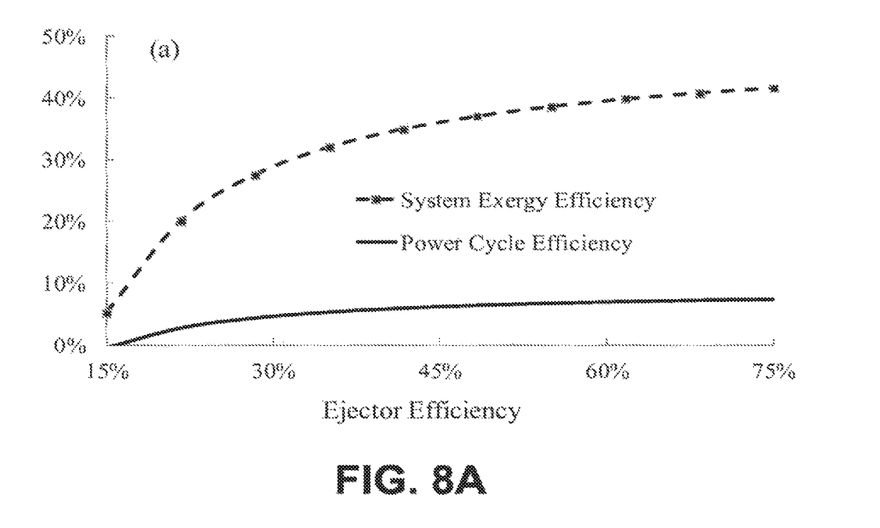
FIGS. 8A and 8B are graphs that illustrate the effect of ejector efficiency on system parameters and show (A) system exergy efficiency and power cycle efficiency and (B) entrainment ratio and turbine pressure ratio.
Figure 8B:
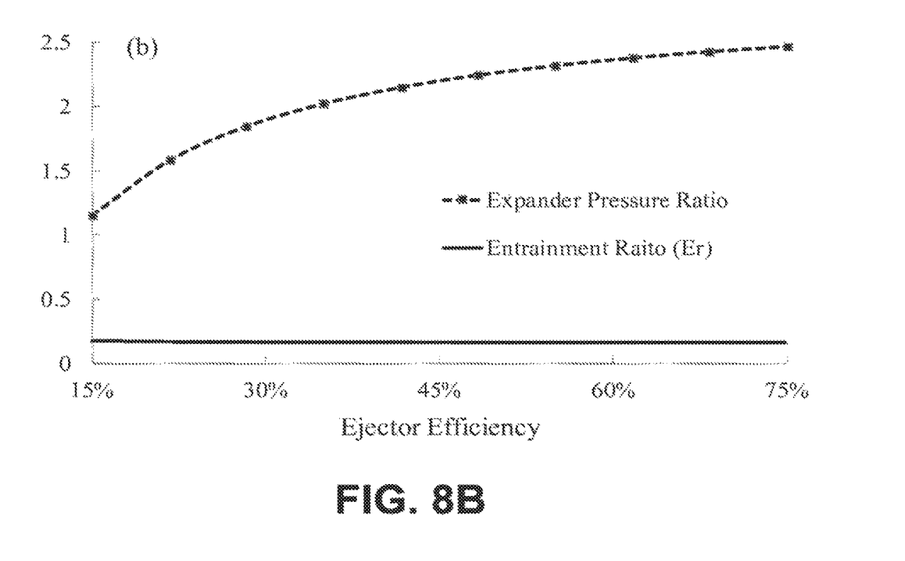
Figure 9A:
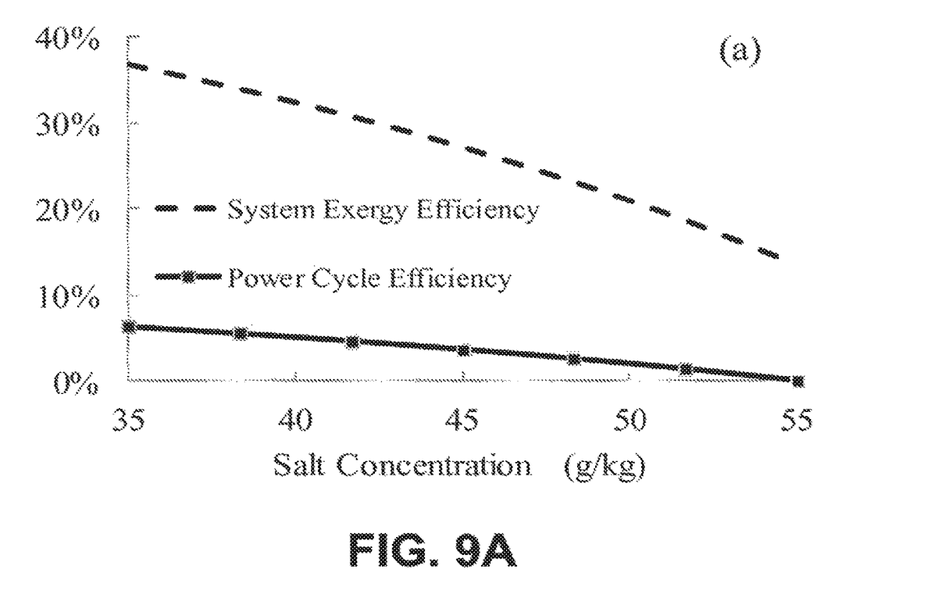
FIGS. 9A and 9B are graphs that illustrate the effect of salt concentration on (A) system exergy efficiency and power cycle efficiency and (B) ejector entrainment ratio and ratio of the ejector destruction to system exergy destruction.
Figure 9B:
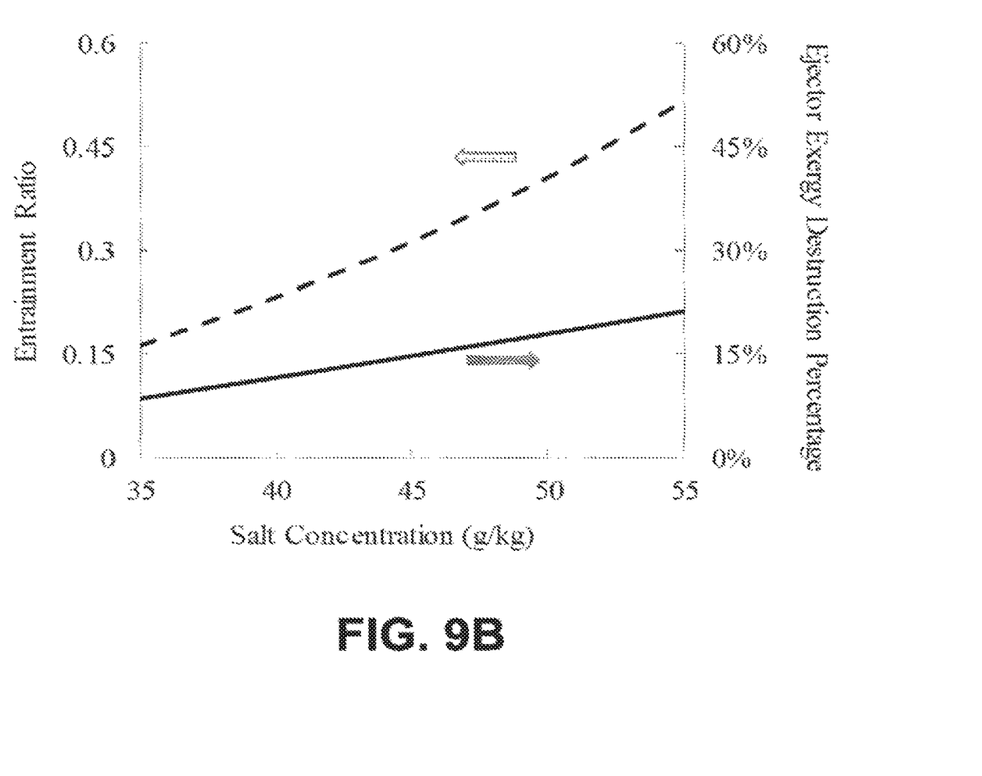

The reported ejector efficiencies vary from less than 10% to up to 90%, depending on the specific conditions. Parametric study results are shown in FIG. 9. FIG. 8A shows a rapid increase in the system exergy and power cycle efficiencies with the efficiency of the ejector. When the ejector efficiency is close to 50%, the effects of ejector efficiency begin to stabilize. FIG. 8A also shows that if the ejector is poorly designed, there could be no net work from the proposed system, which means that external work needs to be provided to power the pump in the system. FIG. 8B shows that the entrainment ratio is relatively constant, while the turbine pressure ratio changes dramatically with the ejector efficiency. The low expander pressure ratio indicates that a scroll expander, which is economical though less efficient, may be used instead of an expensive turbine.

Thermal desalination is not as energy efficient as the RO process when treating brackish water. However, it is suitable to handle highly-concentrated brine, which the RO system cannot handle. The required parameter conditions are listed in Table 3. FIG. 9 shows that the proposed system performance decreases when the salt concentration increases. As previously discussed in FIG. 4, when brine concentration increases, more vapor needs to be condensed when the performance ratio of the MED system is constant. Therefore, the entrainment ratio needs to be increased so as to accept more latent heat of condensation from the MED last-effect vapor. In addition, the ejector destruction will be larger and account for a higher percentage of the whole system destruction.

TABLE 3

Parameters for salt concentration varies sensitivity study

| Fixed Parameters | Independent Parameter | Dependent Parameters |
|---|---|---|
| (1) Ejector efficiency = 47.5% | Salt concentration change | (1) Entrainment ratio (Er) |
| (2) System high pressure 4900 kPa | | (2) System work output (thermal efficiency) |
| (3) 14 Effect MED P.R. = 9 | | |
| (4) Power cycle condensed at 65° C. | | (3) Components exergy destruction compare |
| (5) $\Delta T_{MED\_c}$ = 2° C. | | |
| (6) MED condensed at 35° C. | | |
| (7) MED recovery = 0.3375 | | (4) System exergy efficiency |
| (8) Pump Eff. = 80% | | |
| (9) Turbine Eff. = 85% | | |

One can appreciate that, when the salt concentration is up to 55 g/kg, there is no net work from the system. For a system to be external-electricity independent, an ejector with higher efficiency needs to be used. Table 4 indicates that, when handling highly-concentrated brine, only systems with high efficiency ejectors can be electricity independent.

TABLE 4

Work percentage change when the ejector efficiency and brine concentration change (Water Production 2.7 m³/h, P.R. = 9)

| Ejector Efficiency | Salt Concentration (g/kg) | | | | | |
|---|---|---|---|---|---|---|
| | 35 | 40 | 45 | 50 | 55 | 60 |
| | Power Cycle Efficiency | | | | | |
| 25% | 3.60% | 1.10% | | | | |
| 35% | 5.30% | 3.60% | 1.60% | −0.80% | | |
| 45% | 6.20% | 4.90% | 3.40% | 1.60% | −0.40% | |
| 55% | 6.70% | 5.70% | 4.50% | 3.10% | 1.50% | −0.50% |

*system high operation pressure 4900 kPa

When the feed in brine has a high concentration (e.g., 55 g/kg), the proposed system with PR=9 is as listed in Table 1. The system operates at a pressure of 4900 kPa, the ejector efficiency is 47.5%, and no cooling water is needed for the MED system. The system uses all of its generated work. Table 5 lists the fixed parameters of the system, Table 6 shows the SORC_Ejector subsystem and Table 7 shows the results of a MED system simulation.

TABLE 5

The condition of the fixed parameters

| | |
|---|---|
| Environment temperature | 25° C. |
| Environment pressure | 101325 Pa |
| Dead State Brine Salt Concentration | 35 g/kg |
| MED Performance Ratio | 9 |
| Pump isentropic efficiency (%) | 80 |
| Turbine isentropic efficiency (%) | 85 |
| Boiler Pinch | 8 |
| Ejector Efficiency | 47.50% |
| MED Fresh Water production | 0.748 kg/s (2.7 m³/h) |
| Feed in Brine Concentration | 55 g/kg |
| Feed in water | 2.215 kg/s (8 m³/h) |
| Final effect condensation temperature | 35° C. |

TABLE 6

SORC_Ejector subsystem simulation results

| State | t(° C.) | P(Pa) | h(J/kg) | s(J/kg K) | m(kg/s) | e(kJ/kg) | Dryness |
|---|---|---|---|---|---|---|---|
| 1 | 140 | 4900000 | 595279 | 2098 | 0.5097 | 128880 | 100 |
| 2 | 127.1 | 4006000 | 589871 | 2100 | 0.5097 | 122762 | 100 |
| 3 | 150 | 110000 | 204134 | 218.1 | 0.2208 | 34519 | 0 |
| 4 | 100 | 110000 | 118128 | 1.931 | 0.2208 | 12955 | 0 |
| 5 | 81.3 | 1687000 | 568529 | 2121 | 0.7729 | 95303 | 100 |
| 6 | 65 | 1687000 | 321308 | 1392 | 0.7729 | 65501 | 0 |
| 7 | 65 | 1687000 | 321308 | 1392 | 0.5097 | 65501 | 0 |
| 8 | 68.4 | 4900000 | 326391 | 1395 | 0.5097 | 69695 | Super-critical |
| 9 | 25 | 22012 | 96629 | 332.8 | 2.115 | 381.9 | 0 |
| 10 | 33 | 22012 | 127832 | 436.2 | 2.115 | 767.9 | 0 |
| 12 | 64.99 | 1687000 | 321292 | 1392 | 0.2632 | 17242 | 0 |
| 13 | 33 | 751840 | 321292 | 1405 | 0.2632 | 16168 | 0.2333 |
| 14 | 33 | 751840 | 527209 | 2078 | 0.2632 | 17586 | 1 |
| 15 | 35.9 | 5627 | 133337 | 441.1 | 1.468 | 2637 | 0 |
| 16 | 35 | 5627 | 2564000 | 8351 | 0.05106 | 4042 | 1 |
| 17 | 35 | 5627 | 146588 | 505 | 0.05106 | 35.17 | 0 |
| 18 | 35 | 5627 | 146588 | 505 | 0.6992 | 481.5 | 0 |

TABLE 7

MED system simulation results

| Effect | D(kg/s) | Tv(° C.) | (kg/s) | (° C.) | d̄(kg/s) | T̄(° C) | B(kg/s) | Salt (g/kg) | T(° C) | Tf(° C) | BPE (° C.) |
|---|---|---|---|---|---|---|---|---|---|---|---|
| 1 | 0.04941 | 62.16 | — | — | — | — | 2.166 | 56.25 | 62.85 | — | 0.6933 |
| 2 | 0.04931 | 60.15 | 0.00685 | 60.95 | 0.0001066 | 60.95 | 2.11 | 57.75 | 60.86 | 54.25 | 0.7049 |
| 3 | 0.04954 | 58.12 | 0.006646 | 58.96 | 0.0002254 | 58.95 | 2.054 | 59.33 | 58.84 | 52.45 | 0.7171 |
| 4 | 0.04967 | 56.07 | 0.00643 | 56.94 | 0.0003403 | 56.93 | 1.998 | 61 | 56.8 | 50.64 | 0.7301 |
| 5 | 0.04969 | 54 | 0.006204 | 54.91 | 0.0004501 | 54.9 | 1.942 | 62.75 | 54.75 | 48.83 | 0.7437 |
| 6 | 0.0496 | 51.92 | 0.005968 | 52.87 | 0.0005531 | 52.86 | 1.886 | 64.6 | 52.68 | 47.02 | 0.7582 |
| 7 | 0.04941 | 49.83 | 0.005723 | 50.82 | 0.0006476 | 50.8 | 1.831 | 66.55 | 50.6 | 45.21 | 0.7733 |
| 8 | 0.04911 | 47.72 | 0.005469 | 48.76 | 0.0007319 | 48.74 | 1.776 | 68.59 | 48.51 | 43.4 | 0.7893 |
| 9 | 0.0487 | 45.61 | 0.005207 | 46.69 | 0.0008041 | 46.67 | 1.722 | 70.74 | 46.41 | 41.62 | 0.8061 |
| 10 | 0.04817 | 43.49 | 0.004937 | 44.63 | 0.000862 | 44.6 | 1.669 | 72.99 | 44.31 | 39.84 | 0.8236 |
| 11 | 0.04751 | 41.36 | 0.004658 | 42.56 | 0.0009034 | 42.54 | 1.617 | 75.35 | 42.2 | 38.09 | 0.8419 |
| 12 | 0.04673 | 39.24 | 0.004371 | 40.5 | 0.0009259 | 40.47 | 1.566 | 77.8 | 40.1 | 36.36 | 0.861 |
| 13 | 0.0458 | 37.12 | 0.004076 | 38.45 | 0.0009267 | 38.41 | 1.516 | 80.36 | 38 | 34.66 | 0.8808 |
| 14 | 0.04473 | 35 | 0.003771 | 36.42 | 0.002562 | 36.37 | 1.468 | 83.02 | 35.9 | — | 0.9012 |

The above analysis shows that the proposed system can desalinate concentrated brine without external electricity input. By selecting high-efficiency ejectors, the proposed system could handle highly-concentrated brine without additional electricity input.

The invention claimed is:

1. A water desalination and power generation system, the system comprising:
    a power generation subsystem configured to generate power;
    a water desalination subsystem configured to produce freshwater from salinated water; and
    an ejector that links the power generation subsystem and the water desalination subsystem, the ejector being adapted to entrain working fluid steam that has exited the water desalination subsystem into working fluid steam that has exited the power generation subsystem to generate mixed steam that drives the water desalination subsystem;
    wherein the water desalination subsystem comprises a first evaporator comprising a heating element through which the mixed steam flows and a spray nozzle adapted to spray source water on the heating element.

2. The system of claim 1, wherein the power generation subsystem is an organic Rankine cycle (ORC) subsystem.

3. The system of claim 1, wherein the power generation subsystem is a supercritical organic Rankine cycle (SORC) subsystem.

4. The system of claim 1, wherein the power generation subsystem comprises a boiler that boils working fluid to create boiled working fluid, an expander that expands the boiled working fluid to generate mechanical or electrical power, and a pump that raises the temperature and pressure of condensed working fluid that exits the water desalination subsystem.

5. The system of claim 4, wherein the boiler is configured to be driven by a low-grade heat source.

6. The system of claim 5, wherein the low-grade heat source comprises one of solar energy, geothermal heat, or waste heat from an industrial process.

7. The system of claim 1, wherein the water desalination subsystem is a multi-effect distillation (MED) subsystem.

8. The system of claim 1, wherein the water desalination subsystem is a reverse osmosis (RO) subsystem.

9. The system of claim 1, wherein the water desalination subsystem further comprises a second evaporator comprising a heating element through which freshwater steam output from the first evaporator flows and a spray nozzle from which condensed water from the first evaporator is sprayed.

10. The system of claim 9, wherein the water desalination subsystem further comprises a preheater that preheats the source water before it reaches the first evaporator, wherein the preheater is driven by freshwater steam that exits the second evaporator.

11. The system of claim 10, wherein the water desalination subsystem further comprises a condenser through which the source water flows prior to reaching the first evaporator and through which freshwater steam from the water desalination subsystem flows, wherein the freshwater steam heats the source water.

12. The system of claim 11, wherein the system is configured such that condensed working fluid from the first evaporator also flows through the condenser and wherein the condenser boils the condensed working fluid to generate the working fluid steam that is entrained into the ejector, such that the latent heat of condensation of the freshwater steam is recovered and is reused in the desalination subsystem.

13. The system of claim 10, wherein the water desalination subsystem further comprises a flash box that receives condensed water from the second evaporator and delivers steam to the preheater.

14. The system of claim 13, wherein the water desalination subsystem further comprises a second flash box that receives condensed water from the first flash box and delivers freshwater steam to the condenser.

15. The system of claim 10, wherein the water desalination subsystem comprises a third evaporator comprising a heating element through which freshwater steam output from the preheater flows and a spray nozzle from which condensed water from the second evaporator is sprayed.

16. The system of claim 1, wherein the ejector comprises a converging-diverging nozzle through which a primary flow passes.

17. The system of claim 16, wherein the ejector further comprises a shroud through which the primary flow and a secondary flow pass.

18. A method for desalinating water and generating power, the method comprising:
    boiling a working fluid in a power generation subsystem to generate working fluid steam;
    using the working fluid steam to generate mechanical or electrical power; and
    mixing the working fluid steam output from the power generation subsystem with working fluid steam output from a water desalination subsystem to generate mixed steam that can be used to drive the water desalination subsystem, wherein the water desalination subsystem comprises a first evaporator comprising a heating element through which the mixed steam flows and a spray nozzle adapted to spray source water on the heating element.

19. The method of claim 18, wherein boiling a working fluid comprises boiling the working fluid with energy from a low-grade heat source that comprises one of solar energy, geothermal heat, or waste heat from an industrial process.

20. The method of claim 18, wherein mixing the working fluid steam output from the power generation subsystem with working fluid steam output from the water desalination subsystem comprises mixing the working fluid steam output from the power generation subsystem and the working fluid steam output from the water desalination subsystem using an ejector comprising a converging-diverging nozzle.

21. The method of claim 18, further comprising using freshwater steam output from the water desalination subsystem to boil condensed working fluid output from the water desalination subsystem to generate the working fluid steam that is mixed with the working fluid steam output from the power generation subsystem.

22. The method of claim 21, further comprising using the freshwater steam output from the water desalination subsystem to heat source water that is to be desalinated.

23. The method of claim 22, further comprising preheating the source water using freshwater steam output from the water desalination subsystem.

* * * * *